United States Patent [19]

Hallerback et al.

[11] 4,048,527
[45] Sept. 13, 1977

[54] STATOR AGGREGATE FOR ROTATING ELECTRIC MACHINES

[75] Inventors: Stig Lennart Hallerback, Vastra Frolunda; Leif Lachonius, Sure, both of Sweden

[73] Assignee: SKF Industrial Trading and Development Company, B.V., Jutphaas, Netherlands

[21] Appl. No.: 621,031

[22] Filed: Oct. 9, 1975

Related U.S. Application Data

[62] Division of Ser. No. 504,460, Sept. 9, 1974, Pat. No. 3,932,929.

[30] Foreign Application Priority Data

Sept. 28, 1973 Sweden .................................. 7313243

[51] Int. Cl.² .............................................. H02K 1/04
[52] U.S. Cl. ...................................... 310/43; 310/258
[58] Field of Search ............. 310/43, 42, 40 MM, 172, 310/162, 254, 258, 259, 154, 179, 89, 90, 62, 63, 47, 50; 29/596; 264/272

[56] References Cited

U.S. PATENT DOCUMENTS

| | | | |
|---|---|---|---|
| 2,220,638 | 11/1965 | Petersen | 310/62 |
| 2,500,191 | 3/1950 | Lee | 310/258 |
| 3,144,597 | 8/1964 | Lee | 310/162 |
| 3,156,838 | 11/1964 | Winther | 310/42 |
| 3,341,113 | 9/1967 | Sebok | 310/62 |
| 3,422,295 | 1/1969 | Parker | 310/154 |
| 3,474,527 | 10/1969 | Meyer | 29/596 |
| 3,827,141 | 8/1974 | Hallerback | 310/42 |
| 3,873,861 | 3/1975 | Halm | 310/43 |
| 3,932,928 | 1/1976 | King | 310/43 |
| 3,942,054 | 3/1976 | Kristen | 310/43 |
| 3,955,272 | 5/1976 | Hallerback | 310/43 |

FOREIGN PATENT DOCUMENTS

| 1,613,379 | 7/1970 | Germany | 310/43 |
|---|---|---|---|

Primary Examiner—R. Skudy
Attorney, Agent, or Firm—Eugene E. Renz, Jr.

[57] ABSTRACT

An electric machine comprising a stator and a rotor. The stator consists of two sections made of a mouldable plastic material wherein at least the means providing the magnetic flux is formed integrally with the stator sections. The assembly further includes means securing the stator sections in position circumscribing the rotor.

4 Claims, 5 Drawing Figures

STATOR AGGREGATE FOR ROTATING ELECTRIC MACHINES

This is a division of our prior application, Ser. No. 504,460, filed Sept. 9, 1974, for METHOD OF MAKING A SECTION STATOR FOR A DYNAMO-ELECTRIC MACHINE, which issued as U.S. Pat. No. 3,932,929 on Jan. 20, 1976.

BACKGROUND OF THE INVENTION

The present invention relates to rotating electric machines and comprises primarily a process for the production thereof and especially a new method for the production of the stator and equipment connected to it.

Electric motors have normally a stator with the laminations arranged perpendicular to the rotor axis, and with windings arranged substantially parallel to this axis. The laminations are held together in a package by means of bolts or the like. The stator with connected rotor is usually mounted in a housing or a case of aluminum or other suitable material.

The stator of an electric motor may also have its laminations arranged parallel to the rotor axis. The edges of the laminations along the rotor axis are then bent inwards towards the rotor axis for the guidance of the magnetic flux. The windings may then be arranged around the bent edges or around the middle part of the lamination package. Such motors may be induction motors, commutator motors and permanent magnet motors.

When electric motors are manufactured it is usual that the stator and the rotor are prepared separately in a nearly finished state, whereafter the rotor is mounted with its bearings in the stator. It is then necessary to insert the rotor into the stator cavity from one end and thereafter secure it in its bearings in a convenient way. In conventional assembly methods, any elements such as tools of various kinds carried by the rotor shaft must be assembled to the rotor shaft after the final mounting of the rotor in the stator. For example, the diffuser and the fan wheels in a vacuum cleaner, must therefore be attached stepwise after mounting the rotor. Such a method may lead to sufficient products, but is both complicated and expensive, especially through the time-consuming mounting of the stator windings and of the many small parts which in proper order must be put into the machine from one end.

SUMMARY OF THE INVENTION

By the present invention one has obtained a new process for the production of the above said machines, which process is especially outstanding by its great economical advantages. In accordance with the process of the present invention, the various elements comprising the stator are formed in at least two axially divided sections including as integral elements thereof, the laminations or permanent magnets which are permanently secured in a moulded plastic mass and which sections may thereafter be assembled with a rotor which may also be preassembled to include various components comprising the rotor assembly.

It is advantageous to arrange the laminations and/or the magnets in a mould so that the laminations and/or the magnets form a geometrically accurately confined surface, the elements being permanently fixed in the mould by means of the moulding mass. As a result thereof after-treatment of the rotor cavity by turning or the like becomes superfluous.

The process makes it also possible to furnish the stator with finished bearing seats and fastening means for the electrical conducts between stator and rotor. The mounting of bearings in a conventional electric motor means namely that the bearing is pressed into its final place from one side and is secured in a suitable way. It is important that such a bearing is as much as possible tightly covered, so that contamination is avoided and grease is retained. When a bearing is pushed into its position in a conventional way, the housing in which the bearing is supported can, of course, surround the bearing at only one side, and hence, some kind of seal must be arranged at the other side of the bearing. As such bearings normally are held in position by the friction between the outer side of the outer ring and the housing, rotation of the outer ring may occur, as by heating the housing which usually is made of press-moulded aluminum expands more than the outer ring of this bearing and a certain reduction of the retaining forces will occur.

An appreciable simplification of the mounting of the bearings in electric motors is obtained as a result of the present invention. As above mentioned, it is namely possible to mount the bearing in proper position on the rotor shaft in advance and then from the side press the bearings in the precasted bearing seats. It will then be possible to make the housing surround the bearing completely and also to lock the bearing against rotation in a suitable way.

The assembly method of the present invention is especially adapted for stators divided in at least two axially separated sections including laminations which are axially oriented and include edge portions which are inwardly directed toward the rotor cavity and partly define the same and are circumferentially spaced to form stator poles. This configuration is shown, for example, in FIG. 2 of the drawings.

One may then furnish that part of the laminations making the stator yoke with windings that are embedded in the moulding mass or the yoke part may be made free from windings which are applied later on.

To secure an even magnetic flux the moulding mass may be mixed with a magnetic filler.

In a special embodiment of the invention it is possible to divide the stator core axially through the yokes which are then made to receive the pre-shaped windings simultaneously with the assemblage of the stator parts, a magnetically conducting plastic mass being put into the connection surfaces between the windings.

By making the stator in this way either in two or more parts it will be possible to put the rotor into the rotor cavity from the side instead of inserting it from one end thereafter add the other stator part or parts. Then it will also be possible to divide in two or more parts the equipment belonging to the stator, for instance the diffusor in a vacuum cleaner, a cover for a hand tool, such as a hand drilling machine, or the like.

A vacuum cleaner motor with pertinent equipment may then be mounted in a very simple way by pre-manufacturing the rotor part with fan, bearing etc., and quite simply lay it down into the stator and diffusor which are moulded in one piece.

BRIEF DESCRIPTION OF THE DRAWINGS

The invention will be further described in connection with the attached drawings, on which

Figure 1:
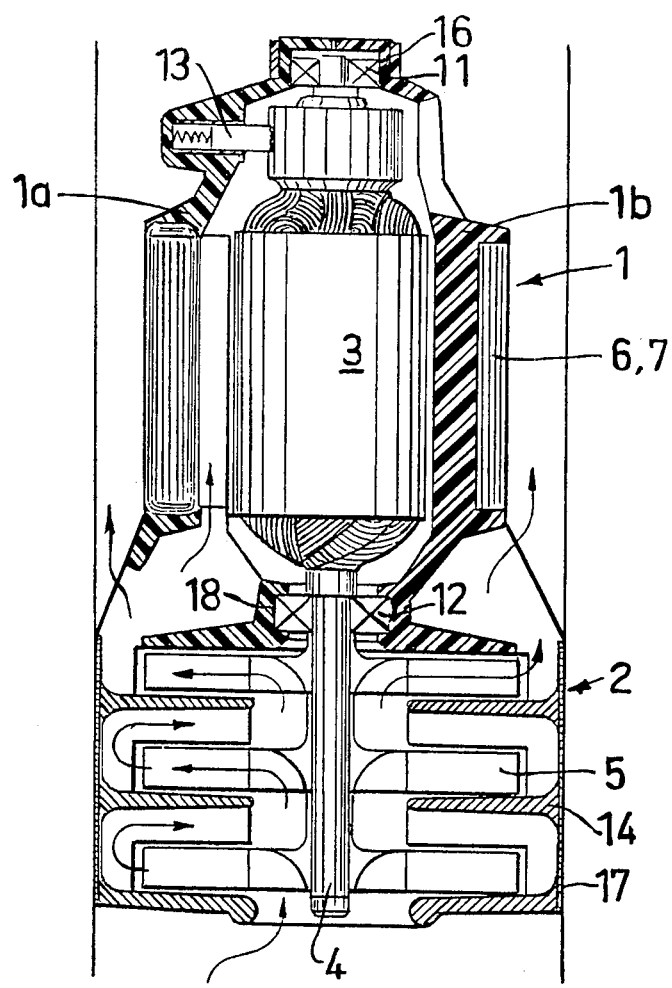
FIG. 1 shows an axial section of an electric motor and an attached fan along the line I—I in FIG. 2.
Figure 2:
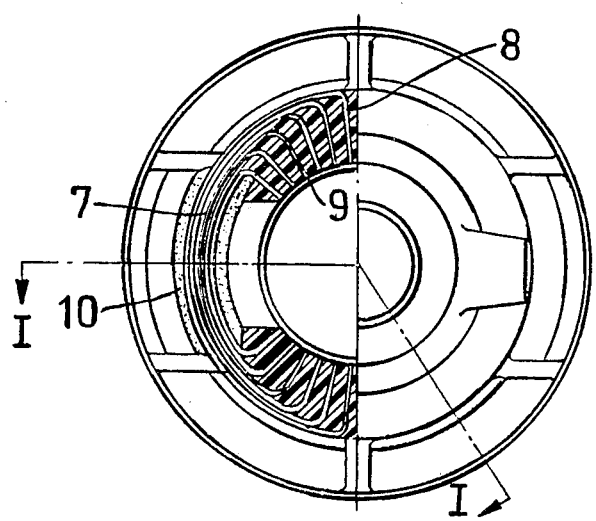

The half of FIG. 2 shows an end view and the other half shows a radial section through the motor in FIG. 1.

Figure 3:
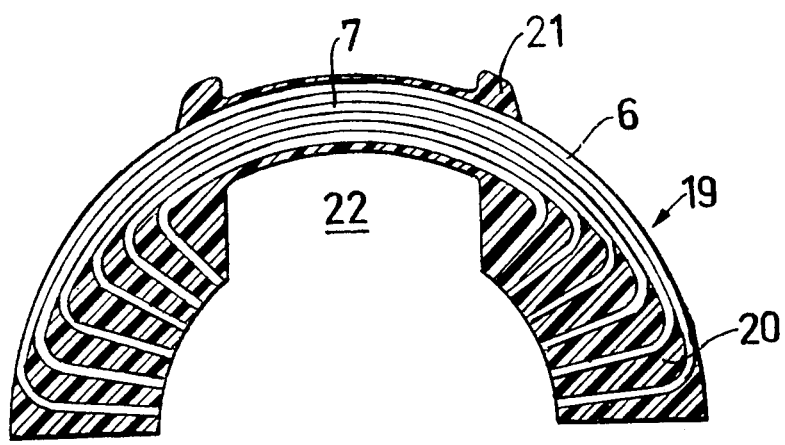
Figure 4:
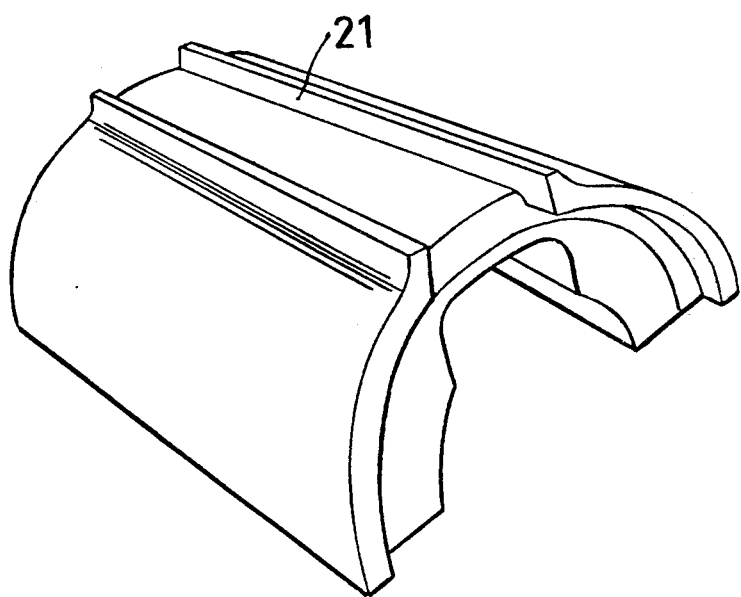

FIG. 3 shows in cross section a part of a stator core and FIG. 4 shows a perspective view of a similar stator core.

Figure 5:
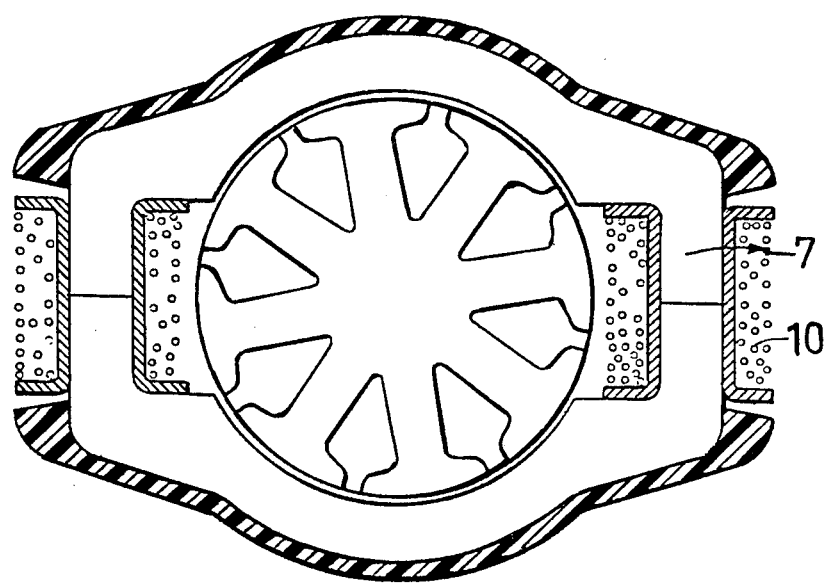

FIG. 5 shows a cross section through an electric motor the stator of which is divided through the yoke parts.

DETAILED DESCRIPTION OF A SPECIFIC EMBODIMENT

FIG. 1 shows an axial section of an electric motor with a stator 1 divided in two parts along an axial plane. The figure shows also a blower housing 2 built together with the stator. On the protruding shaft of the rotor 3 the fan blades 5 can rotate.

The two halves 1a and 1b of the stator 1 are made of axially running laminations 6 which at the central part form the stator yoke 7 and at the edges 8 are bent inwardly and arranged with some distance for forming the stator poles 9, as appears from FIG. 2. For the laminations, plates having the desired magnetic properties are used.

The equally made stator halves 1a and 1b are made from a suitable moulding mass, preferably cured plastic, in a tool that in principle may be known per se. The laminations 6 are moulded in and fixed and their edges are forced by the tool to take such a position that they in the finished stator without after-treatment will lie in the surface of the poles defining the air gap and being coaxial with the rotor.

Before moulding the yoke parts 7 are furnished with stator windings 10 which, consequently, also will be moulded in.

By the production of the stator halves in the tool bearing seats for the rotor bearings 11, 12 and fastening means for the current conductors between the stator and the rotor, e.g. carbon brushes 13, formed at the same time.

In connection with the embodiment example in FIG. 1 the stator halves are also shown enlarged forming a fan housing 14 which is intended to co-operate with fan blades 15 on the projecting rotor shaft 4.

The mounting of the electric motor described is extremely simply carried out by putting the rotor 3 with the bearings 11, 12, and in this case the fan blades 15 from the side into one of the stator halves, which is also made to a half motor housing, whereupon the other half is mounted also from the side and the halves are thereafter firmly united, for instance by means of metal sleeves 16 and 17, which are put on from each end. This production technique makes it possible to produce the stator halves in such finished and accurate shape, that any after-treatment before the mounting may be refrained from.

When ball bearings are used O-ring 18 may be inserted in a ring groove in the bearing seat.

FIGS. 3 and 4 show how a stator core 19 can be built up by laminations 6 and moulding mass 20, e.g. plastic. In this example, it is pre-supposed that the stator winding not shown is mounted afterwards between the two projecting edges 21 and in the gap 22 in front of the stator yoke 7.

FIG. 4 shows also how the ends of a stator core may be designed with edges and central guiding surfaces for instance for receiving special bearing cups.

FIG. 5 shows an end view of the stator aggregate which differs from those shown in FIGS. 1-4 in that it is partly built up by radially arranged laminations and partly in that its dividing plane is so arranged that it goes through the middle of the stator's yoke parts 7 instead of — as shown in FIG. 1 — through its pole parts. In this embodiment the pre-shaped stator winding 10 may be threaded on the yoke parts when assembling the different parts of the stator aggregate. To reduce the magnetic flux resistance in the connection between the yoke parts a suitably magnetically connecting moulding mass is arranged on the connecting surfaces when mounting the parts.

In this embodiment the windings are better cooled as they are not moulded in, and the risk for damages on the winding during the moulding in with plastic is avoided.

A similar arrangement may also be chosen with stator cores having axially running laminations which are then divided in the yoke part.

The principle of the invention may also be applied on electric machines where the magnetic flux in the stator is obtained with permanent magnets and where stator windings accordingly are missing.

What is claimed is:

1. An electric machine consisting of a stator and a rotor, said stator comprising at least two sections made of a moulded plastic material, magnetic flux providing means in the form of laminations formed integrally in each section, said laminations running axially and having inwardly directed terminal edge portions adjacent the inner arcuate surface portions and forming the stator poles, the central part of the laminations forming the stator yoke, each section having circumferentially spaced inner peripheral surface portions of arcuate cross section, said inner peripheral surface portions disposed on the circumference of a circular trace defining the rotor cavity, at least one of said sections having a longitudinally extending interior channel between said inner surface portions forming mounting means for windings, each section having axially spaced pocket sections defining an annular seat for bearings within which the rotor shaft is journalled and clamping means securing the sections together.

2. An electric machine as claimed in claim 1 including a pair of circumferentially spaced longitudinally extending ribs on the outer peripheral surface of said one section forming mounting means for windings.

3. An electric machine as claimed in claim 1 wherein said clamping means comprises a pair of metal sleeves circumscribing said sections adjacent the opposite axial ends thereof.

4. An electric machine as claimed in claim 1 wherein said sections are axially divided.

* * * * *